United States Patent
Steffen et al.

(10) Patent No.: US 11,880,469 B2
(45) Date of Patent: *Jan. 23, 2024

(54) SECURE EMBEDDED MICROCONTROLLER IMAGE LOAD

(71) Applicant: International Business Machines Corporation, Armonk, NY (US)

(72) Inventors: Christopher Steffen, Rochester, MN (US); Chad Albertson, Rochester, MN (US); Nicholas Ollerich, Rochester, MN (US); Eric J. Campbell, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,361

(22) Filed: Jul. 1, 2022

(65) Prior Publication Data

US 2022/0335133 A1 Oct. 20, 2022

Related U.S. Application Data

(63) Continuation of application No. 16/700,708, filed on Dec. 2, 2019, now Pat. No. 11,409,882.

(51) Int. Cl.
*G06F 21/57* (2013.01)
*G06F 21/64* (2013.01)
(Continued)

(52) U.S. Cl.
CPC .............. *G06F 21/575* (2013.01); *G06F 9/24* (2013.01); *G06F 9/4406* (2013.01);
(Continued)

(58) Field of Classification Search
CPC ........ G06F 21/575; G06F 9/24; G06F 9/4406; G06F 11/1004; G06F 21/64; G06F 2221/033
(Continued)

(56) References Cited

U.S. PATENT DOCUMENTS 8,843,650 B2 * 9/2014 Song ........................ H04L 63/10
717/172
9,165,143 B1 10/2015 Sanders
(Continued)

FOREIGN PATENT DOCUMENTS

CN 104067222 A 9/2014
CN 106295318 A 1/2017

OTHER PUBLICATIONS

"Cisco IOS Image Verification," Cisco Security, printed: May 6, 2019, 9 pages. https://tools.cisco.com/security/center/resources/ios_image_verification.html.
(Continued)

*Primary Examiner* — Michael J Brown
(74) *Attorney, Agent, or Firm* — Nathan M. Rau

(57) ABSTRACT

A system and method for providing a secure image load. The system includes a microcontroller. The microcontroller has a plurality of physically modifiable internal components (PMIC). Each of the plurality of PMICs can only be modified one time. The system further includes an image loader configured to load a boot image from the memory of the microcontroller, and a checksum calculator configured to calculate a checksum value for the boot image. The system further includes a checksum burner configured to modify the plurality of PMICs to create a binary representation of the checksum value for the image. A checksum value is calculated for the image. This checksum value is written to the microcontroller. The value is burned into the microcontroller using the PMICs. Further, responses to the checksum mismatch are burned into the microcontroller using the PMICs that are present in the microcontroller.

19 Claims, 4 Drawing Sheets

(51) Int. Cl.
*G06F 9/24* (2006.01)
*G06F 11/10* (2006.01)
*G06F 9/4401* (2018.01)

(52) U.S. Cl.
CPC .......... *G06F 11/1004* (2013.01); *G06F 21/64* (2013.01); *G06F 2221/033* (2013.01)

(58) Field of Classification Search
USPC .................................................. 713/1, 2, 100
See application file for complete search history.

(56) References Cited

U.S. PATENT DOCUMENTS

| | | | |
|---|---|---|---|
| 9,411,688 | B1 | 8/2016 | Poolla |
| 9,583,210 | B1* | 2/2017 | Berger .................. G11C 17/16 |
| 9,639,425 | B1 | 5/2017 | Mishra |
| 9,992,024 | B2 | 6/2018 | Song |
| 11,409,882 | B2* | 8/2022 | Steffen ...................... G06F 9/24 |
| 2004/0255187 | A1* | 12/2004 | Gabriel Vecoven ........................ G06F 11/1004 714/E11.026 |
| 2006/0064576 | A1 | 3/2006 | Chen |
| 2014/0372745 | A1 | 12/2014 | Yu |
| 2017/0371388 | A1 | 12/2017 | Lu |
| 2018/0314830 | A1 | 11/2018 | Strünkmann |
| 2019/0102539 | A1 | 4/2019 | Durham |

OTHER PUBLICATIONS

"Intel® Arria 10 SoC Secure Boot User Guide," AN-759, Nov. 6, 2017, pp. 1-37. https://www.intel.com/content/dam/altera-www/global/en_US/pdfs/literature/an/an-759.pdf.

Disclosed Anonymously, "A Method and System of providing back-up executable images during system boot," An IP.com Prior Art Database Technical Disclosure, IP.com No. IPCOM000227595D, May 8, 2013, 3 pages. https://ip.com/IPCOM/000227595.

Disclosed Anonymously, "A System and Method for Resuming PXE Booting in a Multi-Client Network," An IP.com Prior Art Database Technical Disclosure, IP.com No. IPCOM000195264D, Apr. 27, 2010, 8 pages. https://ip.com/IPCOM/000195264.

Disclosed Anonymously, "OEM secure processors based on generic parts," An IP.com Prior Art Database Technical Disclosure, IP.com No. IPCOM000244594D, Dec. 23, 2015, 3 pages. https://ip.com/IPCOM/000244594.

Disclosed Anonymously, "Self Detection and Correction Method for Handling Multiple Boot Images," An IP.com Prior Art Database Technical Disclosure, IP.com No. IPCOM000199557D, Sep. 9, 2010, 5 pages. https://ip.com/IPCOM/000199557.

Gunes et al., "Verified boot in embedded systems with hard boot time constraints," Master's Theses, 2017, 111 pages.

List of IBM Patents or Patent Application Treated as Related (2022) 2 pages.

PCT/IB2020/061206, International Search Report and Written Opinion, dated Mar. 9, 2021.

Steve Johnson (2006) Trusted Boot Loader—Presentation. CE Linux Forum, Panasonic. San Jose, CA. 37 pages.

AU Application No. 2020398071, Examination report No. 1 for standard patent application. Australian Government—IP Australia, dated Jan. 20, 2023 (3 pgs).

GB2209605.1 Examination Report under Section 18(3), dated Aug. 11, 2023, 5 pgs.

CN202080083624.8 Notification of Grant and Search Report dated Dec. 28, 2022, 5 pgs.

* cited by examiner

SECURE EMBEDDED MICROCONTROLLER IMAGE LOAD

BACKGROUND

The present disclosure relates to image loading, more specifically to ensuring the correct boot image is loaded.

Today, computers load an image from an off chip non-volatile storage. This image is assumed to be valid and secure. However, an attacker can compromise the image and the security of the computer by loading a modified image. If a compromised image is loaded into the associated computer, that computer can then be used for whatever purpose that was desired by the person who modified the image. These purposes can be intentional or unintentional by the user, and can cause if nefarious security weaknesses within an organization.

Embodiments of the present disclosure are directed to a system for providing a secure image load. The system includes a microcontroller. The microcontroller has a plurality of physically modifiable internal components (PMIC). Each of the plurality of PMICs can only be modified one time. The system further includes an image loader configured to load a boot image from the memory of the microcontroller, and a checksum calculator configured to calculate a checksum value for the boot image. The system further includes a checksum burner configured to modify the plurality of PMICs to create a binary representation of the checksum value for the image.

Embodiments of the present disclosure are directed to a method for creating a secure image in a microcontroller. A checksum value is calculated for the image. The checksum value is then written to the microcontroller. This value is then burned into the microcontroller using the PMICs that are present in the microcontroller. Further, responses to a checksum mismatch are also burned into the microcontroller using the PMICs that are present in the microcontroller.

Embodiments of the present disclosure are directed to a method for securing a boot image load. The boot image is loaded from a microcontroller. Next a checksum value is calculated for the loaded boot image. This value is then compared with a checksum value that is store on the microcontroller and has been burned into the microcontroller. The boot image is allowed to continue loading when a match between the checksum value and the stored checksum value is found. When a mismatch is found, a mismatch response is executed. The mismatch response is programed into the microcontroller.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
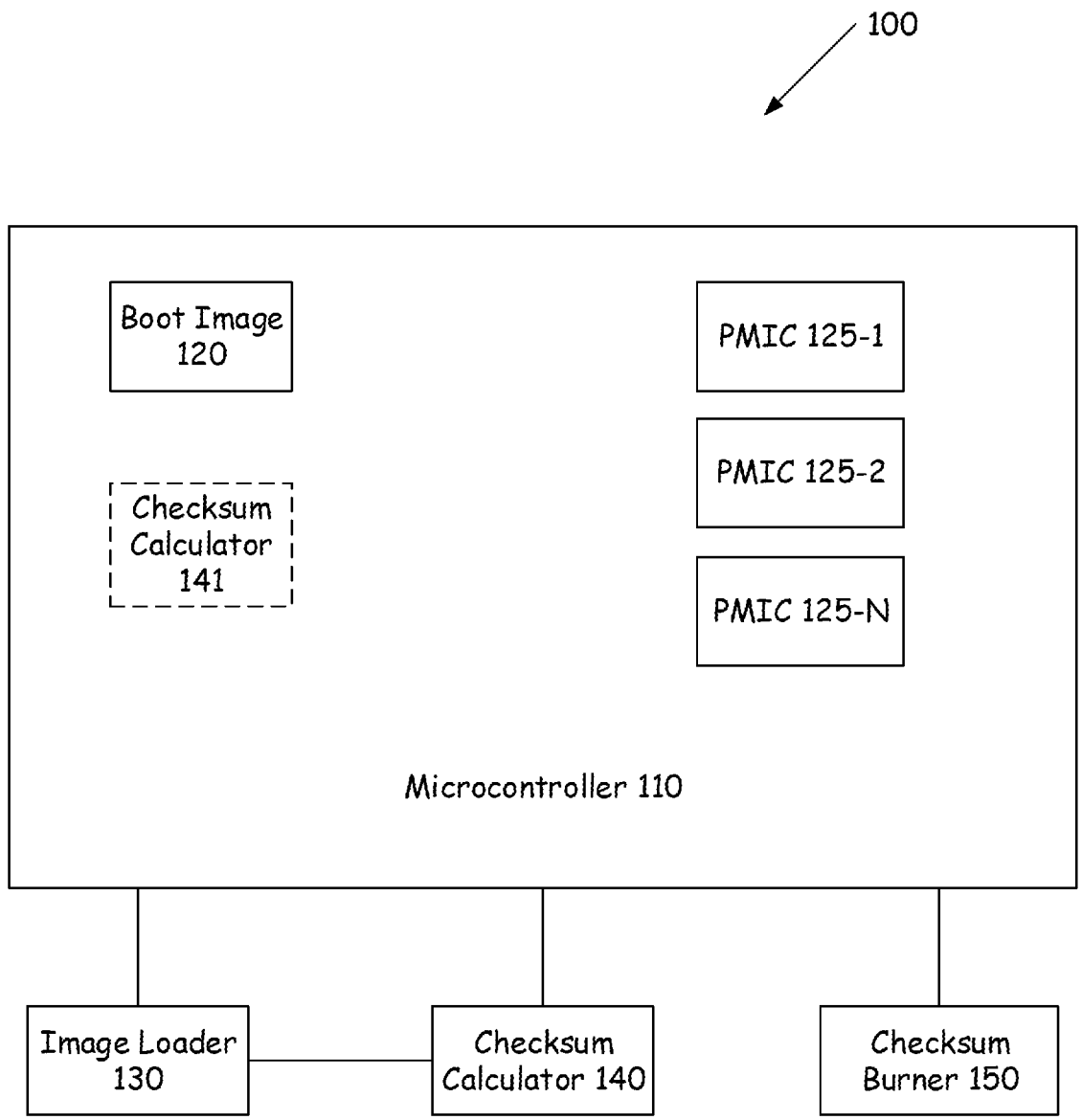
FIG. 1 is a block diagram of a system employing a secure embedded microcontroller image load according to illustrative embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to image loading, more specifically to ensuring the correct boot image is loaded. While the present disclosure is not necessarily limited to such applications, various aspects of the disclosure may be appreciated through a discussion of various examples using this context.

The present disclosure uses a checksum to verify that the image loaded during system initialization matches what the system was originally shipped with. This prevents the external memory from being able to be modified or corrupted without detection after manufacturing.

Other approaches of verifying the boot image 120 use a security header or encryption keys. This header is produced by signing the image with a private key. However, a downside of this approach using a signed image is that a rouge image could be loaded and signed with a working key to produce the security signature the system is expecting. This increases the vulnerability of the system to malicious attacks. The present disclosure does not require or prevent the use of encryption as an additional level of protection. This allows for a cautious company or individual to use both methods of securing their boot image 120 from unwanted or intentional modification.

FIG. 1 is a block diagram of a system employing a secure embedded microcontroller 110 image load according to embodiments. System includes a microcontroller 110, a boot image 120, an image loader 130, a checksum calculator 140, and a checksum burner 150.

The microcontroller 110 is component of the system that provides an embedded application for the system. The microcontroller 110 is embodied on a single integrated circuit chip. The microcontroller 110 includes one or more processor cores (CPUs), memory and input/output peripherals. Depending on the configuration of the microcontroller 110, the program memory can be permanent, read-only memory that can only be programmed at the factory, or it can be field-alterable flash or erasable read-only memory. In the instances where the memory can be changed in the field, it can be useful to verify the integrity of the associated data on the microcontroller 110 to ensure that the data has not been changed since it was original loaded on the microcontroller 110. Further the microcontroller 110 includes a number of physically modifiable internal components 125-1, 125-2, . . . 125-N (collectively PMIC or PMICs 125).

An electronic microcontroller 110 with a physically modifiable internal component (PMIC) can provide benefits over existing security techniques by ensuring that the boot image 120 that is currently loading matches the original boot image 120 that was shipped with the microcontroller 110. The PMIC 125 is incorporated inside the microcontroller 110. In some embodiments, the PMIC 125 is implemented using eFuse, which is a technology for the dynamic real-time reprogramming of computer chips. eFuse has the benefit of once a "fuse" is burned, it can't be restored to its original state. However, in some embodiments PMIC 125 can be an array of e-Fuses, or an EEPROM through a logic circuit, or an EEPROM gated by an e-Fuse. When gated by an e-Fuse, the gate acts as a prevention mechanism to prevent modification of the data/image located past the e-Fuse gate.

The PMIC 125 of the microcontroller 110 is comprised of one or more breakable devices configured to cause an open circuit (e.g., a fuse, a wire, a conductive material with a defined brittleness). Each of the breakable devices may operate through a sacrificial operation, such as breaking. Before being broken, each breakable device is an electronic pathway through which current may flow from one end to another. Electricity can flow through continuously or in response to a request to verify the breakable device. If electricity reaches another end, the circuit is considered closed and the closed circuit may represent a value, such as a "1" or a "0". After being broken, each breakable device is broken such that current may no longer flow from one end to another. For example, the breakable device can be constructed of a fragile nature that severs or vaporizes in response to heat, current, or other relevant cause. If electricity does not reach another end, the circuit is considered open and the open circuit may represent a value, such as a '0' or a '1'. The value represented by an open or closed circuit is the opposite value. That is, for example, if the open circuit has a value of "1" then the closed circuit has a value of "0", and vice versa. The process of breaking the circuit can be performed by, for example, vaporizing, melting, burning, blowing, rupturing, physically modifying, or otherwise disrupting the flow of current through the particular circuit. Each of the breakable devices can operate by receiving an electrical current that causes the creation of the open circuit (e.g., an overcurrent, an excessive load).

The PMIC 125 can effectuate operation directly. In some embodiments, the PMIC 125 can include logic that reads the number of breakable devices and their current state. In some embodiments, the logic is not included in the PMIC 125. For example, the logic can be located within a sensor or computer housing the PMIC 125. In another example, the logic can be in a second integrated circuit and can be communicatively coupled to the PMIC 125 through logical traces of a circuit board or through a communication cable or other wire. In some embodiments, the PMIC 125 can apply a current directly to the breakable device. In some embodiments, the PMIC 125 can apply a current indirectly to a breakable device and applying a second current directly to the breakable device. In a first example, a first current is applied to a wire adjacent to a plurality of breakable devices causing the breakable devices to increase in temperature (e.g., heating). After heating, a second current is applied directly to one or more of the plurality of breakable devices causing one or more breakable devices to break, and consequently, creating one or more permanently open circuits. In some embodiments the current applied to the breakable devices in the PMIC 125 to cause the break is provided by an outside source. In this embodiment, the PMIC 125 does not have the internal ability to break any of the breakable devices. In this way the pattern of the breakable devices cannot easily be changed once the microcontroller 110 is programmed.

A boot image 120 is a computer file containing the complete contents and structure of a computer storage media. When the boot image 120 is transferred onto the microcontroller 110 it allows the associated hardware of the microcontroller 110 to boot or load. The boot image 120 includes an operating system, utilities and diagnostics. The boot image 120 can also include boot and data recovery information. The image can also include applications that are specific to the particular end use of the microcontroller 110. Once the boot image 120 has been built, it can be simply copied onto devices, patched within reasonable limits, and remains disposable in case of any problems. This occurs because unlike other images pure boot image 120s contain no mission-critical data. A pure boot image 120 contains no data that cannot be reproduced from configurations or off-the-shelf executables. In particular, end-user data is not part of a boot image 120, although some operating systems require that a copy of user preferences or configuration files be kept within the boot image 120 itself, e.g. Microsoft Windows registry. The boot image 120 of the present disclosure generally is fixed at the time the microcontroller 110 is installed in the associated system such that modification of the boot image 120 is not anticipated during the life of the corresponding system. However, there may be instances where the boot image 120 may be modified. These changes may be intentional, such as when an error is later identified in the boot image 120 following distribution. Conversely, these changes may be unintentional (from the perspective of the system's owner), such as a hacker or other malicious source modifying the boot image 120 to allow for malicious use of the associated system or data on the system. While the present disclosure discusses the image as a boot image, it should be understood that any image that the user desires to protect from corruption or other modification can be used, such as an application image.

The image loader 130 is the part of system that loads the boot image 120 from the memory of the microcontroller 110 to the memory of the system. The image loader 130 is stored in the ROM of the system. However, in some embodiments it may be stored in other locations. The image loader 130 places the boot image 120 into memory in preparation for execution of the boot image 120. The image loader 130 reads the contents of the boot image 120 into memory, and carries out other required tasks to prepare the boot image 120 for execution. Once loading is complete, control is passed to the loaded program code. The image loader 130 can execute a series of basic hardware tests to ensure that the system is ready to execute the boot image 120. One of the tests that the image loader 130 performs is verifying the checksum associated with loaded boot image 120. If the checksum of the boot image 120 does not match the checksum that is burned into the microcontroller 110, the image loader 130 proceeds to follow a set of instructions that are burned into the microcontroller 110. These instructions tell the image loader 130 how to proceed in the event of a mismatch between the checksums. These instructions can include instructions to halt or otherwise stop the loading and execution of the boot image 120, notifying an administrator or other user of the mismatch, or asking for additional user input prior to proceeding with the loading and execution of the boot image 120. Other responses to the mismatch can also be programmed into the microcontroller 110. In some embodiments, the microcontroller 110 can perform the process of checking the checksum value and executing the mismatch instructions.

The checksum calculator 140 is a component of the system that calculates a checksum for the boot image 120. The checksum calculator 140 takes the boot image 120 and applies a process to the boot image 120 to calculate a checksum value for the boot image 120. Checksum calculator 140 can employ any approach for calculating a checksum, such as parity byte, parity word, modular sum, or position dependent. Further, in some embodiments the checksum can be calculated by using hash functions. The length of the checksum is dependent on the level of security desired in the device as well as the number of eFuses that are present in the microcontroller 110. The size of the checksum can range from between 1 and 1024 bits. However, in the instances where a cryptographic hash function is used the checksum can have any number of bits. The checksum calculator 140 calculates the checksum for the boot image 120 prior to the boot image 120 being loaded onto the microcontroller 110 for the first time, such as at the factory. The checksum calculator 140 also calculates the checksum for the boot image 120 upon each time the boot image 120 is loaded by the image loader 130. This checksum value is provided to the checksum burner 150 in the first instance and the image loader 130 in all subsequent instances. In some embodiments, there are two checksum calculators 140 and 141. The first checksum calculator 140 is maintained at the location where the boot image 120 is first loaded into the microcontroller 110, and the second checksum calculator 141 is located on the device associated with the microcontroller 110. In this embodiment both checksum calculators 140 and 141 implement the same approach for calculating the checksum, such that both calculators will arrive at the same value for the same boot image 120.

The checksum burner 150 is a component of the system that burns the checksum value calculated by the checksum calculator 140 into the microcontroller 110. The checksum is burned into the microcontroller 110 using the PMIC 125 portions of the microcontroller 110. The value of the checksum is converted to a binary value. This binary value is then burned in by changing the broken/unbroken status of a number of the PMIC 125 such that the corresponding value represents the checksum value. For example, if a 256 bit checksum is used and the calculated value is "120EA8A25E5D487BF68B5F7096440019" the corresponding binary representation of the checksum is:

00110001 00110010 00110000 01000101 01000001 00111000
01000001 00110010 00110101 01000101 00110101 01000100
00110100 00111000 00110111 01000010 01000110 00110110
00111000 01000010 00110101 01000110 00110111 00110000
00111001 00110110 00110100 00110100 00110000 00110000
00110001 00111001

To burn this value into the microcontroller 110, the microcontroller 110 needs to have to have at least 256 PMICs 125 available. The checksum burner 150 then, depending on the method used for determining a "0" or a "1", burns the corresponding circuit to either open the circuit or close the circuit. However, the microcontroller 110 can have any number of PMICs 125 such that not all of the available PMICs 125 are used for the checksum. Further, the checksum can be any number of bits. However, the microcontroller 110 should have at least the number of PMICs 125 as the number of bits in the checksum.

The checksum burner 150 is further configured to burn in to the microcontroller 110 instructions for how the image loader 130 responds to a mismatch between the burned in checksum and the calculated checksum for the boot image 120 at the time of the loading of the boot image 120. A complete set of instructions can be burned into the microcontroller 110. In order to burn in the complete set of instructions, the microcontroller 110 needs to have a sufficient number of PMICs 125 available to permit the installation of the instructions in binary form. However, in some embodiments, only a portion of the instructions are burned into the microcontroller 110. In these embodiments, the portion of the instructions can include a pointer to a location where the full set of instructions is stored. For example, an address is burned into the microcontroller 110, such that when a mismatch occurs the image loader 130 accesses this address from the microcontroller 110, and proceeds to the address to obtain the set of instructions that it needs to implement in response to the mismatch. However, other ways of directing the image loader 130 to the set of instructions through the burned in PMICs 125 can be used.

Figure 2:
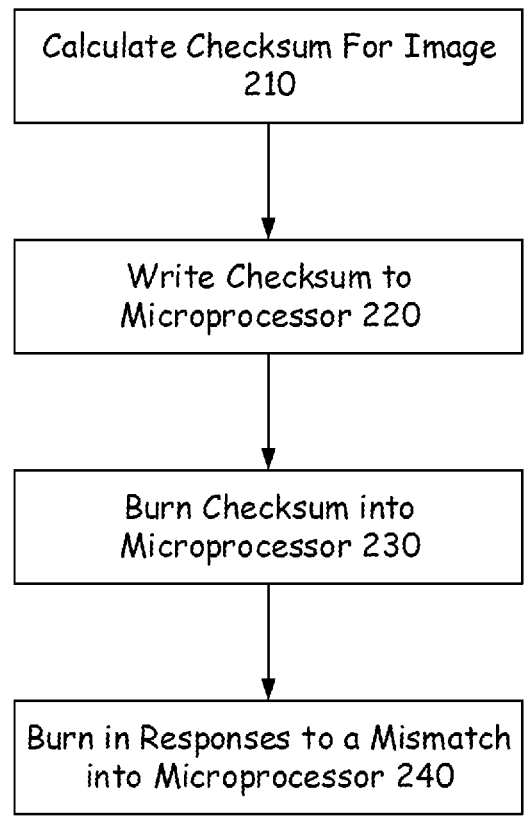
FIG. 2 is a flow diagram illustrating a process of how the system loads and burns in the checksum values into the microcontroller according to illustrative embodiments.

FIG. 2 is a flow diagram illustrating a process of how the system loads and burns in the checksum effuses into the microcontroller 110 according to embodiments. The process begins by calculating a checksum for the image to be loaded onto the microprocessor. This is illustrated at step 210. The process can employ any approach for calculating a checksum, such as parity byte, parity word, modular sum, or position dependent. Further, in some embodiments the checksum can be calculated by using hash functions. The length of the checksum is dependent on the level of security desired in the device as well as the number of eFuses that are present. The size of the checksum can range from between 1 and 2048 bits. The number of bits in the checksum is not limited by the above number of bits, as it is anticipated that the number of bits available for checksums will continually grow. However, in the instances where a cryptographic hash function is used the checksum can have any number of bits. The desired boot image 120 is passed through the checksum calculator 140 to determine the value of the checksum.

Once the checksum has been calculated the system proceeds to write the checksum to the microprocessor. This illustrated at step 220. To write the checksum to the microprocessor the checksum burner 150 receives the checksum value and then determines what PMICs 125 of the microcontroller 110 need to be broken. In this way the checksum burner 150 determines which PMICs 125 should have their corresponding value changed. Again depending on how the system determines what a "0" or a "1" is will determine which particular PMICs 125 need to be broken.

After the checksum has been written to the hardware, the system proceeds to burn in the checksum into the PMICs 125. This is illustrated at step 230. To write the checksum to the microprocessor the checksum burner 150 applies breaks the corresponding PMICs 125 such that a corresponding value of "1" or a "0" is created. The process of breaking the circuit can be performed by, for example, vaporizing, melting, burning, blowing, rupturing, physically modifying, or otherwise disrupting the flow of current through the particular circuit. Each of the PMICs 125 can operate by receiving an electrical current that causes the creation of the open circuit (e.g., an overcurrent, an excessive load).

Following burning in the checksum, the system then proceeds to determine the response that the hardware should have when the checksum does not match with the checksum for the image that is being loaded. This is illustrated at step 240. The checksum burner 150 then burns this response into the microcontroller 110 through additional PMICs 125 onboard the microcontroller 110. In some embodiments, the complete set of responses to the mismatch are burned into microcontroller 110. However, in other embodiments only a portion of the response is burned into the microcontroller 110. For example, an address or other pointer to a complete set of instructions can be burned into the microcontroller 110, such that the image loader 130 will follow the address provided to obtain and execute the complete set of instructions in response to the mismatch.

Figure 3:
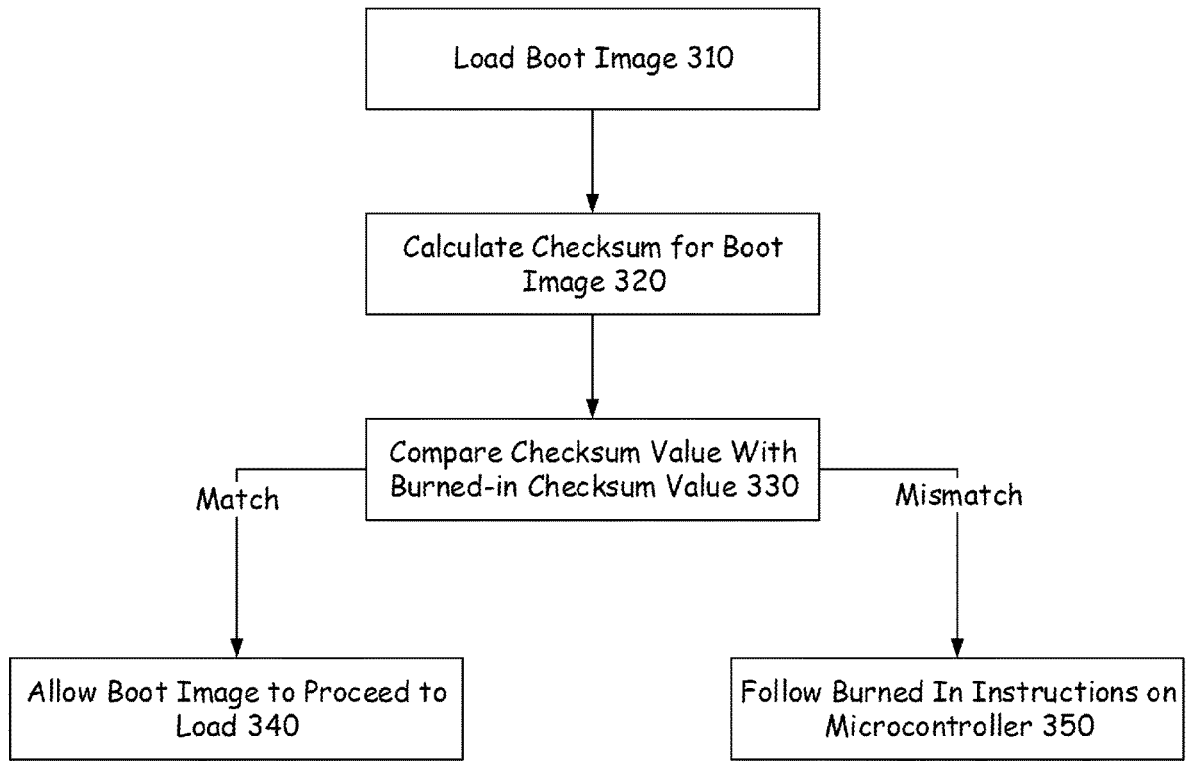
FIG. 3 is a flow diagram illustrating a process of how the system operates during normal operation according to illustrative embodiments.

FIG. 3 is a flow diagram illustrating a process of how the system operates during normal operation to ensure that the system loads properly. The process begins by loading the boot image 120 into sRAM. This is illustrated at step 310. The boot image 120 can be loaded into the sRAM using any known method for loading an image into memory. In some embodiments the boot image 120 is loaded into other memory locations than sRAM.

As the boot image 120 is being loaded into the memory the checksum for the boot image 120 is calculated. This is illustrated at step 320. The checksum calculator 140 calculates the checksum value for the boot image 120 using the same process that was used to calculate the checksum value that is burned into the microcontroller 110. For example, the checksum calculator 140 can employ any approach for calculating the checksum, such as parity byte, parity word, modular sum, or position dependent. Further, in some embodiments the checksum can be calculated by using hash functions. The size of the checksum can range from between 1 and 2048 bits. However, in the instances where a cryptographic hash function is used the checksum can have any number of bits.

The checksum value is provided to the image loader 130. The image loader 130 then compares the checksum value received from the checksum calculator 140 with the checksum value that is burned into the microcontroller 110. This is illustrated at step 330. If the checksum values match the image loader 130 proceeds to load the boot image 120 and allows the boot image 120 to continue its processes. This is illustrated at step 340.

If the checksum values do not match, the image loader 130 proceeds to determine the response to the mismatch. This is illustrated at step 350. The image loader 130 proceeds to check the microcontroller 110 to determine if there are a set of instructions that should be followed in the event of a mismatch. These instructions can include either full instructions or partial instructions as how to respond to the mismatch. If full instructions are provided the image follows those instructions. However, if partial instructions are provided, the image loader 130 can follow those partial instructions to obtain the full set of instructions. As discussed above, the partial instructions can instruct the image loader 130 to go to a particular location to obtain the complete set of instructions. By having only a pointer to the full set of instructions, the user of the system can modify those instructions at a later date without impacting the security of the overall system. The instructions can instruct the image loader 130 to for example, stop the loading of the boot image 120, notify a user or administrator of the mismatch while still loading the boot image 120, notify the user or administrator of the mismatch and wait for further instructions from them, permit the loading of the image without further action, or any other action that the user or administrator may desire.

Figure 4:
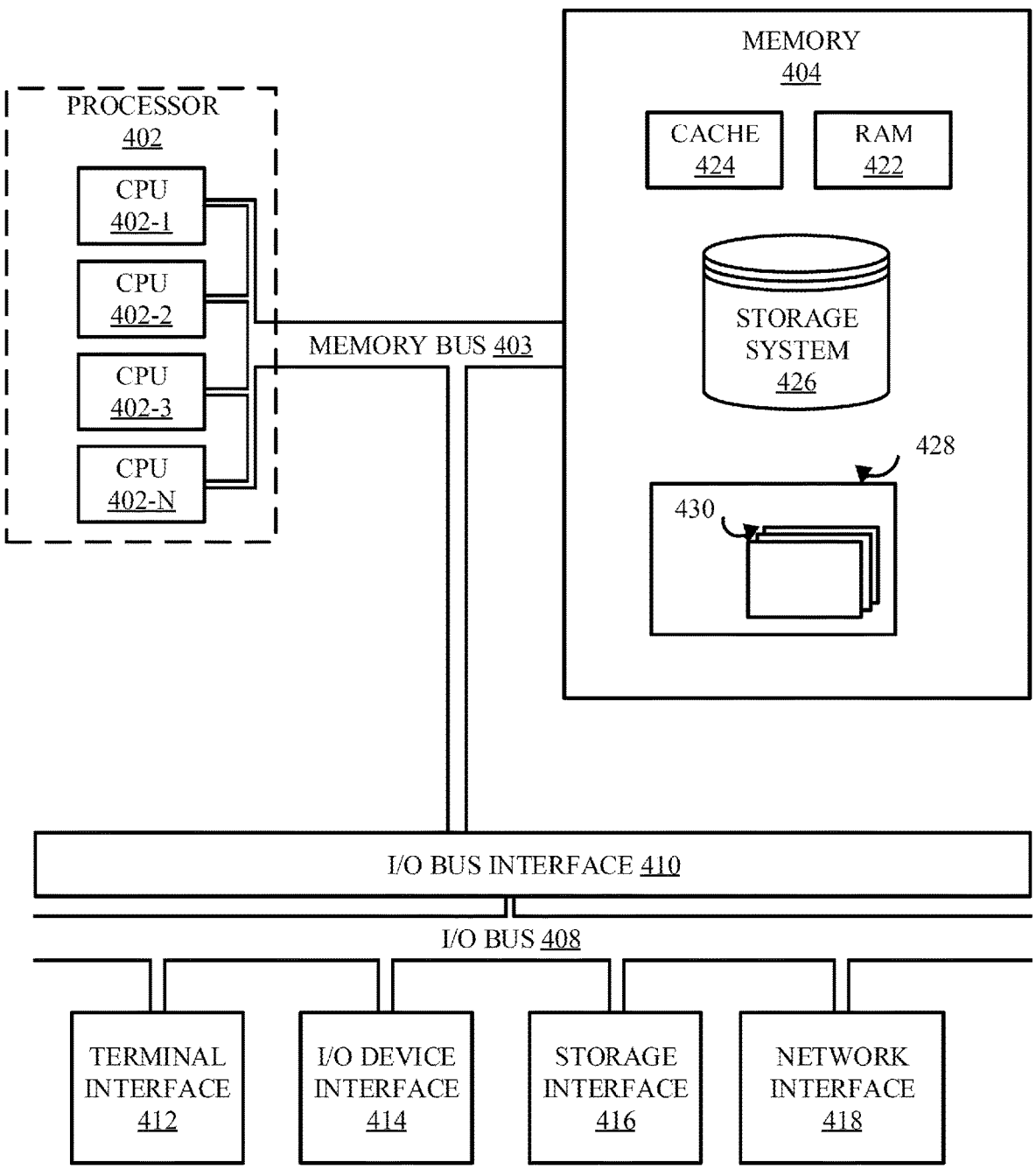
FIG. 4 is a block diagram illustrating a computing system according to one embodiment.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402-1, 402-2, 402-3, and 402-N, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 403 generally perform the functions or methodologies of various embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for providing a secure boot image loading, comprising:
   a microcontroller;
   an image loader configured to load a boot image from memory of the microcontroller;
   a plurality of physically modifiable internal components (PMIC) disposed on the microcontroller, wherein each of the plurality of PMICs can only be modified one time, wherein the plurality of PMICs include a binary representation of a checksum value for the boot image; and
   wherein the image loader is configured to call a checksum calculator to calculate a second checksum value for the boot image each time the boot image is loaded, and to compare the second checksum value with the checksum value in the plurality of PMICs to determine if the second checksum value and the checksum value are the same.

2. The system of claim 1 wherein the second checksum value and the checksum value are the same, wherein the image loader is configured to continue to allow the boot image to load.

3. The system of claim 1 wherein the second checksum value and the first checksum value are not the same, wherein the image loader is configured to execute a mismatch response.

4. The system of claim 3 wherein the mismatch response is burned into the plurality of PMICs.

5. The system of claim 4 wherein the mismatch response prevents further loading of the boot image.

6. The system of claim 4 wherein the mismatch response alerts a user of the mismatch.

7. The system of claim 4 wherein the mismatch response further prevents loading of the boot image until a response is received from the user.

8. The system of claim 4 wherein the mismatch response is a partial response.

9. The system of claim 8 wherein the partial response is a pointer to an address where a complete mismatch response is stored.

10. A method comprising:
    burning in a checksum value for a boot image into a microcontroller; and
    burning in responses to a checksum mismatch into the microcontroller.

11. The method of claim 10 wherein the checksum value is burned into a plurality of physically modifiable internal components (PMIC) disposed on the microcontroller, wherein each of the plurality of PMICs can only be modified one time.

12. The method of claim 11 wherein the checksum value is burned into the plurality of PMICs as a binary representation of the checksum value.

13. The method of claim 10 wherein the response to a checksum mismatch are burned into a plurality of physically modifiable internal components (PMIC) disposed on the microcontroller, wherein each of the plurality of PMICs can only be modified one time.

14. A microcontroller comprising:
    a plurality of physically modifiable internal components (PMIC), wherein each of the plurality of PMICs can only be modified one time, wherein the plurality of PMICs include a binary representation of a checksum value for the boot image and at least one response to a checksum mismatch.

15. The microcontroller of claim 14 wherein the at least one response prevents further loading of the boot image.

16. The microcontroller of claim 14 wherein the at least one response alerts a user of the mismatch.

17. The microcontroller of claim 14 wherein the at least one response further prevents loading of the boot image until a response is received from the user.

18. The microcontroller of claim 14 wherein the at least one response is a partial response.

19. The microcontroller of claim 18 wherein the partial response is a pointer to an address where a complete mismatch response is stored.

* * * * *